US012708897B2

(12) United States Patent
Bernard

(10) Patent No.: US 12,708,897 B2
(45) Date of Patent: Aug. 18, 2026

(54) THREE-DIMENSIONAL SAMPLE SCANNING SYSTEM

(71) Applicant: STILLA TECHNOLOGIES, Villejuif (FR)

(72) Inventor: Fabien Bernard, Paris (FR)

(73) Assignee: STILLA TECHNOLOGIES, Villejuif (FR)

( * ) Notice: Subject to any disclaimer, the term of this patent is extended or adjusted under 35 U.S.C. 154(b) by 711 days.

(21) Appl. No.: 18/027,443

(22) PCT Filed: Sep. 22, 2021

(86) PCT No.: PCT/EP2021/076098
§ 371 (c)(1),
(2) Date: Mar. 21, 2023

(87) PCT Pub. No.: WO2022/063845
PCT Pub. Date: Mar. 31, 2022

(65) Prior Publication Data

US 2023/0330664 A1 Oct. 19, 2023

(30) Foreign Application Priority Data

Sep. 22, 2020 (EP) .................................... 20306078

(51) Int. Cl.
*B01L 3/00* (2006.01)
*G01N 21/64* (2006.01)

(52) U.S. Cl.
CPC ...... *B01L 3/502715* (2013.01); *G01N 21/645* (2013.01); *B01L 2200/025* (2013.01); *B01L 2300/0609* (2013.01); *B01L 2300/0654* (2013.01); *G01N 2021/6471* (2013.01)

(58) Field of Classification Search
None
See application file for complete search history.

(56) References Cited

U.S. PATENT DOCUMENTS 4,977,325 A 12/1990 Bowen et al.
9,824,259 B2 11/2017 Liebel et al.
2003/0127609 A1* 7/2003 El-Hage ............. G01N 21/6452 250/574
2004/0262162 A1* 12/2004 Roach .............. G01N 27/44791 204/600
2010/0151474 A1* 6/2010 Afanasyev ......... G01N 21/6452 435/6.13
2016/0011048 A1* 1/2016 Niggl .................. G01N 35/028 356/328

(Continued)

FOREIGN PATENT DOCUMENTS

CN 109652288 A 4/2019
DE 69012088 T2 10/1994

(Continued)

*Primary Examiner* — Henry H Nguyen
(74) *Attorney, Agent, or Firm* — Panitch Schwarze Belisario & Nadel LLP; Erin M. Dunston

(57) ABSTRACT

System for sample scanning comprising a movable sample holder, an optical device, a base element, at least first and second displacement means, and a camera for receiving a scattered light by a sample, wherein the optical device and the element are located between the first stage and the second stage and the first direction is perpendicular to the second direction.

18 Claims, 6 Drawing Sheets

(56) References Cited

U.S. PATENT DOCUMENTS

| | | | | |
|---|---|---|---|---|
| 2016/0101418 | A1 | 4/2016 | Lee et al. | |
| 2018/0059132 | A1* | 3/2018 | Christey | C12Q 1/6853 |
| 2018/0188178 | A1* | 7/2018 | Luo | G01N 21/6458 |

FOREIGN PATENT DOCUMENTS

| | | | |
|---|---|---|---|
| EP | 0032774 | | 10/1987 |
| EP | 1620572 | A2 | 2/2006 |
| KR | 10-2009-0061786 | A | 6/2009 |
| WO | WO-02059585 | A2 | 8/2002 |
| WO | WO-2017063045 | A1 | 4/2017 |

* cited by examiner

THREE-DIMENSIONAL SAMPLE SCANNING SYSTEM

CROSS-REFERENCE TO RELATED APPLICATIONS

This application is a U.S. National Stage Application pursuant to 35 U.S.C. § 371 of International Patent Application PCT/EP2021/076098, filed on Sep. 22, 2021, and published as WO 2022/063845 on Mar. 31, 2022, which claims priority to European Patent Application 20306078.5, filed on Sep. 22, 2020, all of which are incorporated herein by reference in their entireties for all purposes.

FIELD OF INVENTION

The present invention relates to the field of sample scanning systems. In particular, the present invention relates to the field of movable systems for light emission and for fluorescence detection of scattered light. The invention is particularly suitable for use in the analysis of PCR (Polymerase Chain Reaction) results and digital PCR results, the latter involving the generation of aqueous droplets for nucleic acid amplification and analysis.

BACKGROUND OF INVENTION

Sample scanning systems can be used with a sample within an optically clear material to allow for optical excitation (fluorescence) or illumination (selective absorption) of such sample. Generally speaking, a sample plate or microfluidic chip containing an array of samples to be analyzed is inserted in a system with an optical module which exposes the sample(s) to an excitation light and detects the scattered light. This allows for optical detection of spectroscopic properties of said scattered light from said sample in, for instance, a microfluidic chip.

This principle is applied by US patent application publication No US2016/0101418 disclosing a method of quantifying nucleic acids in a sample that includes generating a plurality of droplets in oil within a microfluidic device, wherein at least some of the droplets comprise a nucleic acid, amplification reagents, and a fluorescent probe or dyes contained therein. The droplets are delivered to a collection chamber to form an array of droplets. Those droplets are subject to thermal cycling within the collection chamber a plurality of times to perform nucleic acid amplification within the droplets. The array of droplets is imaged during the plurality of thermal cycles as well as at a thermal cycle endpoint. An initial concentration of nucleic acid in the sample is calculated based on at least one of a ratio of aqueous phase droplets exhibiting fluorescence within the array at the thermal cycle endpoint or a cycle threshold (Ct) of one or more aqueous phase droplets within the array.

This disclosure allows the array of droplets to be imaged during a plurality of thermal cycles as well as at a thermal cycle endpoint. Changing filters in this disclosure is time consuming since the configuration does not allow an easy change of such filters.

To improve movement accuracy, U.S. Pat. No. 9,824,259 is known to relate to a device and a method for microscopy of a plurality of samples, wherein the device comprises: a first optical detector which is designed to consecutively adopt a plurality of measuring positions and to detect first image data of a sample with a first spatial resolution at each measuring position; an image data analyzer device which is designed to determine for each sample a region of the sample to be examined represented within the first image data in each case; a second optical detector, which is coupled to the first optical detector in such a manner that the second optical detector tracks the first optical detector and therefore the second optical detector adopts measuring positions which the first optical detector had previously adopted. The second optical detector is designed to detect for each sample respective second image data from the region to be examined in the sample concerned, with a spatial resolution that is higher than the first spatial resolution.

In this disclosure, the detector holder is arranged on an XY coordinates motorized stage. This disclosure improves spatial resolution but the sample analysis positions are directly related to the number of optical detectors. The number of focusing positions is therefore limited.

In European patent EP 1 620 572, sample wells are scanned by moving a detection module and activating an excitation/detection channel. The detection module is moved such that the excitation/detection channel is sequentially positioned in optical communication with each of the plurality of sample wells. This apparatus includes a support structure attachable to a thermal cycler and a detection module movably mountable on the support structure. The detection module includes one or more channels, each having an excitation light generator and an emission light detector both disposed within the detection module. When the support structure is attached to the thermal cycler and the detection module is mounted on the support structure, the detection module is movable so as to be positioned in optical communication with the plurality of wells.

This disclosure allows different samples to be imaged with a thermal cycler however, changing filters in this disclosure is time consuming since the configuration does not allow an easy change of such filters. Focusing requires human intervention. In addition, having the thermal cycler within the system makes it more complex.

Therefore, an improved system allowing more flexibility for image scanning with an improvement on accuracy is needed so as to overcome the disadvantages of the prior art. In addition, more flexibility when using filters is also sought.

SUMMARY

Therefore, the present invention relates to a system for sample scanning according to claim 1. Embodiments of the system are disclosed in the dependent claims.

In an embodiment, the system comprises:

- a first stage comprising
  - a movable sample holder having a sample slot,
  - a first displacement means coupled to the sample holder for moving said sample holder in a first direction,
- an optical device comprising a light source for emitting light towards the sample slot,
- an element comprising:
  - a first tube with a longitudinal axis along the optical path of the light emitted by the light source towards the sample slot,
  - a second tube with a longitudinal axis for housing light scattered by a sample located in the sample slot,
- wherein the longitudinal axis of the first tube and the longitudinal axis second tube form an angle $\alpha$ lower than 90°,
- a second stage extending in a plane parallel to the first stage and comprising:
  - a second displacement means coupled to the optical device for moving said optical device in a second direction, and a third displacement means coupled to the element for moving said element in direction parallel to the second direction, and a camera for receiving scattered light by a sample located in the sample slot, wherein the optical device and the element are located between the first stage and the second stage and the first direction is perpendicular to the second direction.

In a preferred embodiment, the first displacement means is coupled to the sample holder for moving said sample holder in a first direction Y and is driven by a first motor for improved accuracy and so as to limit human intervention.

Preferably, the first motor is cable-connected to said sample holder.

In a preferred embodiment the second displacement means is coupled to the optical device for moving said optical device in a second direction X and is driven by a second motor for improved accuracy and so as to limit human intervention.

More preferably, the third displacement means which is coupled to the element for moving said element in a direction parallel to the second direction X, is driven by a third motor for improved accuracy and so as to limit human intervention.

In a particular embodiment, the first displacement means is made of a first rail system and at least one U-shaped component and is coupled to the sample holder, said first rail system being configured to guide the at least one U-shaped component in the first direction Y.

This first rail system is easy to implement compared to other possible displacement means. It improves accuracy for displacements in the first direction Y thus accuracy for perpendicularity in second X and third Z directions is maintained.

In another particular embodiment, the second displacement means is made of a second rail system and at least one second U-shaped component and is coupled to the optical device, said second rail system being configured to guide said second U-shaped component in the second direction X.

This second rail system is easy to implement compared to other possible displacement means. It improves accuracy for displacements in the second direction X thus accuracy for perpendicularity in first Y and third Z directions is maintained.

In still another particular embodiment, the third displacement means is made of a third rail system and at least one third U-shaped component and is coupled to the element, said third rail system being configured to guide said at least third U-shaped component in the second direction X. This third rail system is easy to implement and improves accuracy for displacements in the second direction X, allowing the optical device and the element to move in the very same direction.

Preferably, the movable sample holder comprises at least two sample slots.

In a preferred embodiment, the optical device according to the invention comprises a main plate that extends in a plane perpendicular to the second stage and from which extends perpendicularly in the same direction:

i. the light source, ii. an emitted light filter plate and iii. a scattered light filter plate, said main plate being configured such that:

the emitted light filter plate is configured to be in the optical path of light emitted by the light source, and the scattered light filter plate is configured to be in the optical path of light scattered by a sample.

This configuration allows the emitted light filter plate and the scattered light filter plate to move together thus improving their positioning accuracy.

In an even more preferred embodiment, the emitted light filter plate comprises an array of emitted light apertures and the scattered light filter plate comprises an array of scattered light apertures so as form pairs of apertures for lights respectively emitted by the light source and scattered by a sample. This allows multiple pairs of filters to be immediately available for use with reduced risk of contamination. It also reduces the image analysis time since filter change is easy and automatic.

In an embodiment, the emitted light filters and the scattered light filters are arranged on one or more disks (like turrets) coupled to the emitted light filter plate and the scattered light filter plate, which allows an easy selection of the filters by rotation of disks induced by motors.

In another embodiment, the emitted light filters are arranged in a linear disposition in the emitted light filter plate and the scattered light filters are arranged in a linear disposition in the scattered light filter plate, which allows an easy selection of the filter by a translation movement along linear displacement means. Preferably, both linear dispositions are parallel. This configuration is especially suitable in the context of the present invention based on translation movements.

In another preferred embodiment, the emitted light filters and the scattered light filters are arranged on one or more linear plates, said plates extending in the same direction from a main plate. This configuration requires only one displacement means and alignment of one emitted light filter with the paired scattered light filter is handled with more precision as filters are in a fixed relative position.

In another embodiment, the element comprises a first slit with a section shape complementary to the emitted light filter plate, said first slit being located in the first tube and a second slit with a section shape complementary to the scattered light filter plate, said second slit being located in the second tube so that the emitted light filter plate 36 and the scattered light filter plate can slide inside the first and second slits to align pairs of emitted and scattered light apertures to the optical path of emitted and scattered light. This configuration improves integrity of the filter plate configured to receive different filters. The optical device is therefore movable within the element for changing the filter slot and hence potentially the filter and this for different positions of samples and/or filter since the element is movable as well as the sample slot. Analysis time is reduced thanks to this configuration.

In a particular embodiment the system further comprises a bright field light source coupled to the second tube and configured to emit a bright light towards a sample located in the sample slot. In a preferred embodiment, the bright field light source is located at a position substantially symmetrical to the first tube longitudinal axis with regard to the second tube longitudinal axis. This results in two symmetrical excitation paths resulting in the same scattered light path, each one forming, preferably, a similar angle $\alpha$ at more or less 5°. This configuration allows by-passing the emitted light filter plate for the bright field light source.

Preferably, the sample holder is further coupled to a fourth motor for a focus adjustment in a third direction Z perpendicular to both the first Y and second X directions.

Even more preferably, the system according to the invention further comprises an electronic control unit for controlling alone or in combination the first, second, third and fourth motors.

In a preferred embodiment, a sample mask is located between the element and the sample slot, said sample mask being preferably a flat metallic component having a rectangular light-through hole for guiding the excitation light and the sample-scattered light. This sample mask faces the area to be imaged and avoids illuminating and degrading by, e.g., photobleaching, the other areas of the sample. Preferably, the duration of exposure of a given sample area is less than 20% of total the time required for image acquisition. More preferably, this time is less than 15% and even more preferably, this time is less than 10%, yet even more preferably this time is less than 5% of the total time required for image acquisition, i.e. during which the sample is illuminated.

In a preferred embodiment, the present invention relates to a system for sample scanning, said system comprising:

- a first stage comprising a sample slot able to move in first direction Y,
- an optical device comprising a light source for emitting light towards the sample slot, said optical device being configured to be displaceable in a second direction X
- an element comprising a first tube with a longitudinal axis along the optical path of the light emitted by the light source towards the sample slot, and a second tube with a longitudinal axis along the optical path of light scattered by a sample in the sample slot towards a camera, wherein said element is configured to be displaceable in a second direction X,
- a second stage extending in a plane parallel to the first stage and comprising means for displacing the optical device and the element in the second direction X, and
- a camera for receiving light scattered by a sample located in the sample slot, wherein the optical device and the element are located between the first stage and the second stage and the first direction is perpendicular to the second direction. In a particular embodiment, the system is used for digital PCR and does not include a thermocycler within. In this particular embodiment, said thermocycler is located in another apparatus to have the two functions of image analysis and thermocycling separated and independent.

Definitions

In the present invention, the following terms have the following meanings:

- "stage" refers to a floor or flat shaped level of the system according to the invention.
- "optical path" refers to the direction taken by light emitted by a light source; it also includes a change of direction after scattering.
- "angle lower than 90°" excludes the 0° degree angle in the scope of the invention.
- "perpendicular and parallel" features according to the invention include the error margin of the tool used to measure such features.
- "rail system" according to the invention may include more than one rail.
- "pair of filters" according to the invention means two filters that are respectively in the path of emitted and a scattered light.
- "case" according to the invention means a container that is configured to fixedly hold elements in space. A case may include a hollow object with a shape configured to surround an optical path of light. The walls of the case are not necessarily solid and could include openings that allow circulation of air and let light pass there-through, since the scanning system may be used in a dark enclosure. In an embodiment however, the case may be opaque, thereby avoiding outside light entering the case and adding perturbations to light travelling in the case. Besides, the inside of the case may be treated or geometrically shaped so as to avoid diffusion and reflections of light travelling inside the case. The case may be a cylinder or have any other suitable shapes.
- The term "digital PCR" or "dPCR" refers to a PCR assay performed on portions of a sample to determine the presence/absence, concentration, and/or copy number of a nucleic acid target in the sample, based on how many of the sample portions support amplification of the target. Digital PCR may (or may not) be performed as endpoint PCR. Digital PCR may (or may not) be performed as real-time PCR for each of the partitions. PCR theoretically results in an exponential amplification of a nucleic acid sequence (analyte) from a sample. By measuring the number of amplification cycles required to achieve a threshold level of amplification (as in real-time PCR), one can theoretically calculate the starting concentration of nucleic acid. In practice, however, there are many factors that make the PCR process non-exponential, such as varying amplification efficiencies, low copy numbers of starting nucleic acid, and competition with background contaminant nucleic acid. Digital PCR is generally insensitive to these factors, since it does not rely on the assumption that the PCR process is exponential. In digital PCR, individual nucleic acid molecules are separated from each other into partitions, then amplified to detectable levels. Each partition then provides digital information on the presence or absence of each individual nucleic acid molecule within each partition. When enough partitions are measured using this technique, the digital information can be consolidated to make a statistically relevant measure of starting concentration for the nucleic acid target (analyte) in the sample. The concept of digital PCR may be extended to other types of analytes, besides nucleic acids. In particular, a signal amplification reaction may be utilized to permit detection of a single copy of a molecule of the analyte in individual droplets, to permit data analysis of droplet signals for other analytes (e.g., using an algorithm based on Poisson statistics). Exemplary signal amplification reactions that permit detection of single copies of other types of analytes in droplets include enzyme reactions.

DESCRIPTION OF THE DRAWINGS

The following detailed description will be better understood when read in conjunction with the drawings. For the purpose of illustrating, the system is shown in the preferred embodiments. It should be understood, however that the application is not limited to the precise arrangements, structures, features, embodiments, and aspect shown. The drawings are not drawn to scale and are not intended to limit the scope of the claims to the embodiments depicted. Accordingly, it should be understood that where features mentioned in the appended claims are followed by reference signs, such signs are included solely for the purpose of enhancing the intelligibility of the claims and are in no way limiting on the scope of the claims.

Features and advantages of the invention will become apparent from the following description of embodiments of a system, this description being given merely by way of example and with reference to the appended drawings in which.

Figure 1A:
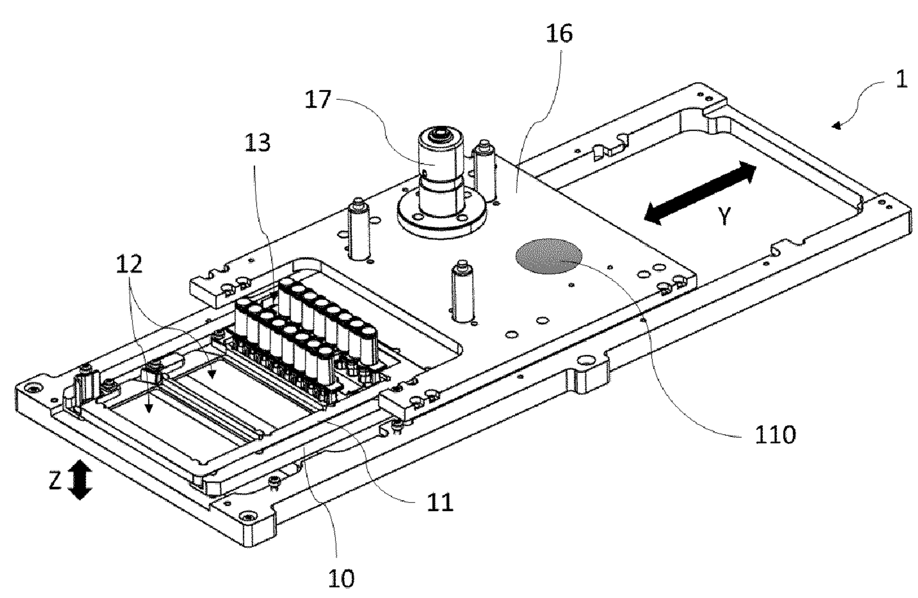
FIG. 1A is a perspective view of the first stage of a system according to an embodiment of the invention.

While various embodiments have been described and illustrated, the detailed description is not to be construed as being limited hereto. Various modifications can be made to the embodiments by those skilled in the art without departing from the true spirit and scope of the disclosure as defined by the claims.

ILLUSTRATIVE EMBODIMENTS OF THE INVENTION

To improve flexibility and accuracy of the scanning systems, the invention proposes a system for sample scanning comprising a sample holder 11 configured to hold a sample 13, preferably a microfluidic chip, an optical device 3, a base element 4 configured to receive the optical device 3, and displacement means 20, 21 configured to move the optical device 3 and the base element 4 with respect to each other and the base element 4 and the sample holder 11 with respect to each other.

Figure 1B:
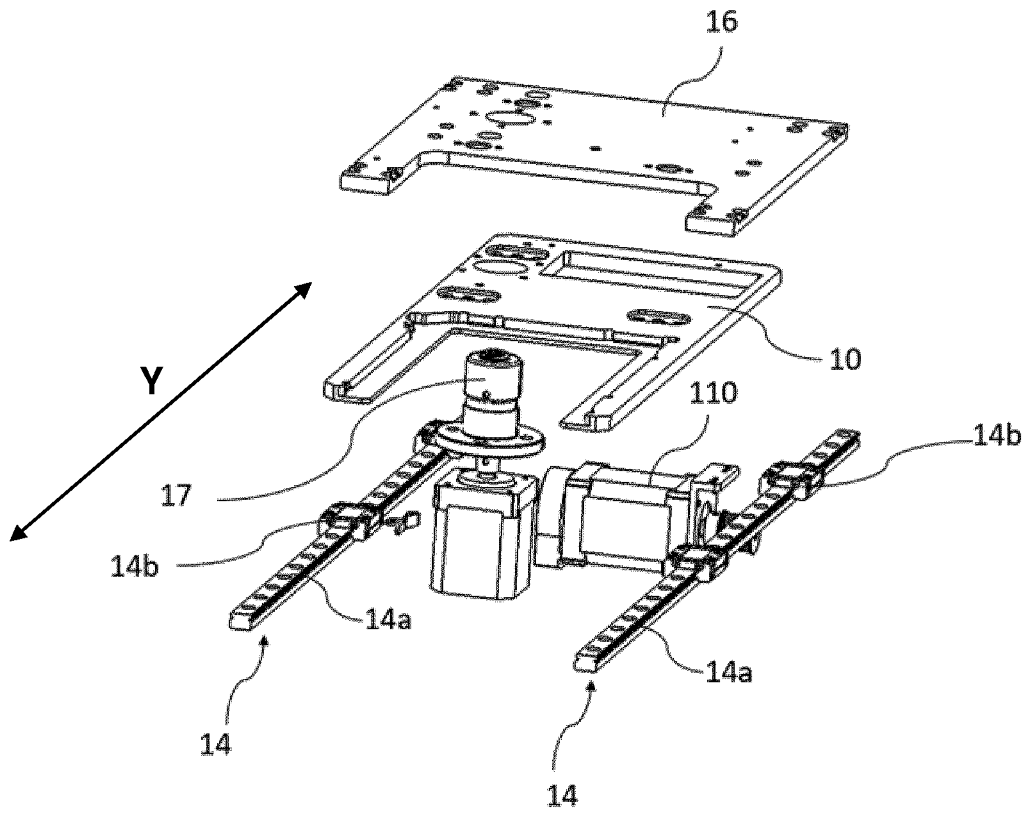
FIG. 1B is a perspective exploded view of the first stage of FIG. 1A.

FIGS. 1A and 1B show the first stage 1 of the system according to an embodiment of the invention in perspective and exploded views. The double headed arrow Y of FIG. 1A illustrates the ability of the sample holder 11 to move the sample holder 11 along a longitudinal direction Y, said sample holder 11 being configured to hold a sample 13 such as a microfluidic chip. Such movement takes place along the longitudinal direction Y so as to allow a longitudinal scan of said microfluidic chip 13.

In an embodiment, the sample holder 11 comprises at least one sample slot 12 configured to hold a sample 13. In a preferred embodiment, the size and shape of the sample slots 12 is complementary with the size and shape of the sample 13 to be scanned so that the sample 13 perfectly fits in a sample slot 12. The sample slot 12 may therefore be rectangular or have any shape suitable to accommodate the sample.

The sample holder 11 may include a plurality of sample slots 12, such as two or three sample slots 12. Having multiple sample slots 12 facilitates scanning of numerous samples 13 while reducing manipulations and therefore risks of sample contaminations. Alternatively, the sample holder 11 comprises jaws configured to hold one or several samples 13.

As can be seen in FIG. 1A, the sample 13 itself can comprise multiple areas to be analyzed.

Movement of the sample holder 11 along direction Y may be driven by a motor 110 (symbolized in FIG. 1A and drawn in FIG. 1B) along first displacement means 14 (cf. FIG. 1B). The first displacement means 14 is a slide link, which may include a first rail system 14*a* and U-shape components 14*b*. In FIG. 1A, the sample holder 11 is able to move back and forth along the longitudinal direction Y. In an embodiment, the sample holder 11 rests on a holder support 10. In the illustrated embodiment, both the sample holder 11 and the holder support 10 are flat-shaped rectangular elongated parts extending in the same longitudinal direction Y of motorized displacement of the sample holder 11.

In FIG. 1A, the flat shaped lid 16 is coupled to the sample holder 11 and the holder support 10. The sample holder 11, and hence the sample 13 configured to be held by the sample holder 11, is also able to move in a vertical direction Z, which is perpendicular to a first plane comprising the sample holder 11 and the longitudinal direction Y. Such movement along the vertical direction Z may be driven by a motor 17.

The sample holder 11 is able to move longitudinally in the first plane.

Figure 2:
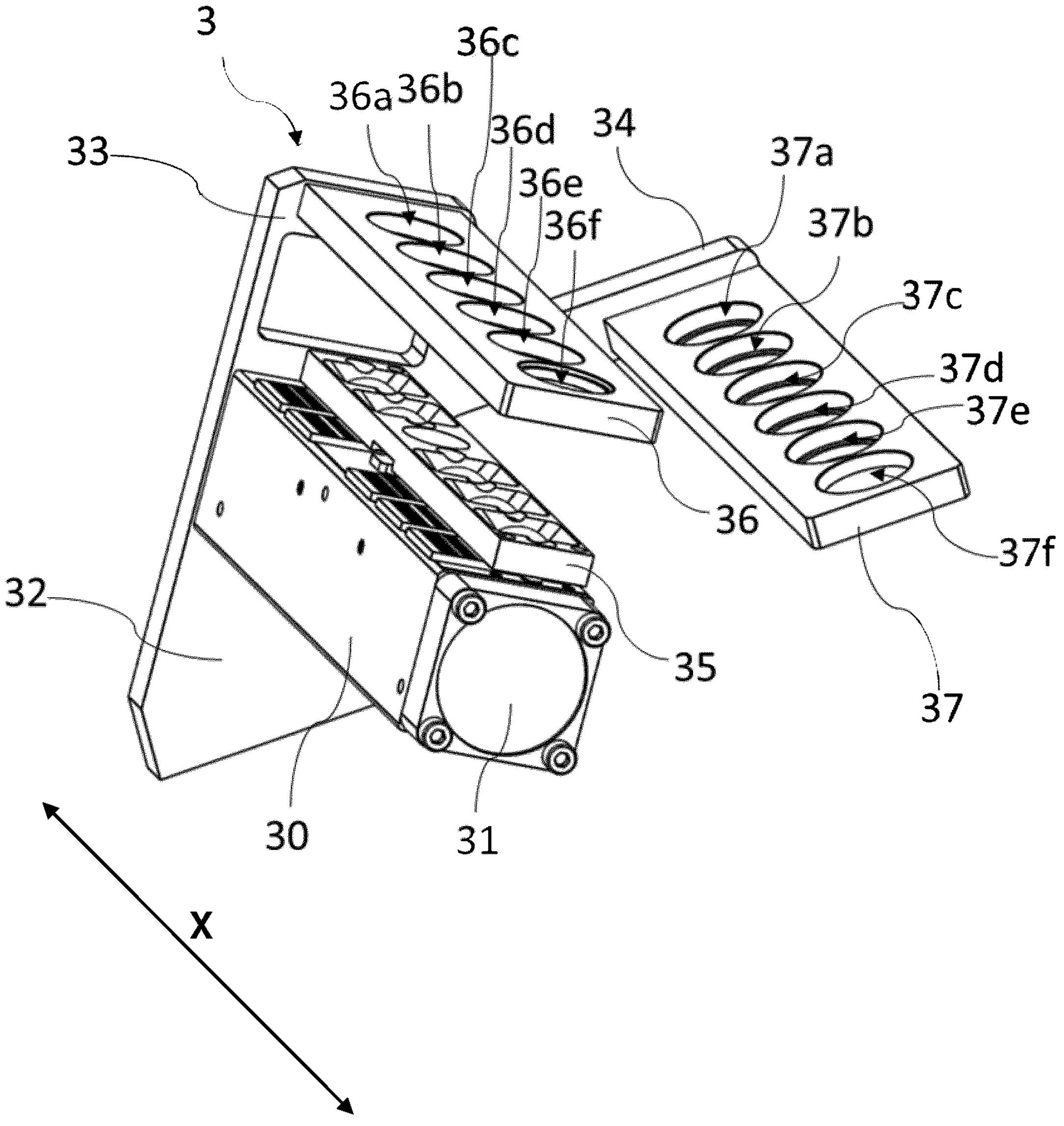
FIG. 2 is a schematic representation of an optical device according to an embodiment of invention.

FIG. 2 is an isolated view of an example of optical device 3. The optical device 3 comprises a main plate 32 that extends in a second plane perpendicular to the first stage 1. The second plane is therefore perpendicular to the first plane.

The optical device comprises a light source 30, the emitted light filter plate 36 and the scattered light filter plate 37. The light source 30, the emitted light filter plate 36 and the scattered light filter plate 37 extend from the main plate 32 in a same direction X, which is perpendicular to the second plane. Preferably, the light source 30, the emitted light filter plate 36 and the scattered light filter plate 37 are fixed with respect to each other. The light source 30 may extend centrally from the main plate 32. In an embodiment, the light source 30 comprises a longitudinal array of Light Emitting Diodes (LED) 35.

The emitted light filter plate 36 may extend from an edge 33 of the main plate 32. The emitted light filter plate 36 comprises a number of filters 36 *a-f* located in corresponding filter slots and configured to be in the optical path P1 of light emitted by the light source 30.

The scattered light filter plate 37 may extend from a free end of an arm 34 that extends from the main plate 32. The scattered light filter plate 37 also comprises a number of filters 37 *a-f* located in corresponding filter slots and configured to be in the optical path P2 of light scattered by the sample 13 held by the sample holder 11 (cf. FIG. 1A). The filters 37 *a-f* and 36 *a-f* cooperate in pairs. Therefore, the number of filters 37 *a-f* is equal to the number of filters 36 *a-f*. Optionally, the number of LEDs is also equal to the number of filters 36*a-f*, 37 *a-f*.

In an embodiment, the emitted light filter plate 36 comprises an array of six filters 36 *a-f* and the scattered light filter plate 37 comprises an array of six filters 37 *a-f*. Optionally, the light source 30 may then include six LEDs.

The light source 30, the emitted light filter plate 36 and the scattered light filter plate 37 are monobloc. In other words, these three elements 30, 36 and 37 are solid and move as one piece. Therefore, the optical device is movable with respect to the sample holder 11 and comprises arrays of filters 36 *a-f*, 37 *a-f* so as to allow different filters to be applied to the emitted and scattered light. More particularly, pairs of filters 36*a*-37*a*, 36*b*-37*b*, 36*c*-37*c*, 36*d*-37*d*, 36*e*-37*e*, 36*f*-37*f* may be placed, one pair at the time, in the path P1, P2 of the light from emission by the light source 30 to reception by a camera capture device after scattering onto the sample 13.

The base element 4 is configured to receive the optical device 3 and position the emitted light filter plate 36 and the scattered light filter plate 37 with respect to the sample holder 11. In that purpose, the base element 4 may include a first case 41 that extends along a longitudinal axis 4A, which is configured to be aligned with the optical path P1 of the light emitted by the light source 30 towards the sample holder 11, and a second case 42 that extends along a longitudinal axis 4B, which is configured to be aligned with the optical path P2 of the light scattered by the sample 13 towards the camera 43.

In an embodiment, the angle α between the longitudinal axis 4A of the first case 41 and the longitudinal axis 4B of the second case 42 is less than 90°, preferably between 25° and 60°, preferably between 30° and 45° and even more preferably between 35° and 45°.

In the illustrated embodiment, the camera 43 is housed in base element 4. This is however exemplary and by no way a limitation.

The first and second cases 41, 42 may have any appropriate shape and section. For example, the first and second cases 41, 42 may each include a tube, which may be cylindrical with a squared, rectangular or circular section. The tube may have a solid wall to prevent light from passing therethrough. Alternatively, the cases 41, 42 may include any structure capable of receiving and positioning the light filter plate 36, the scattered light filter plate 37 and the light source 30 with respect to the sample holder 11.

The first case 41 comprises a first slit 411 with a rectangular section complementary to the emitted light filter plate 36 section, so that said emitted light filter plate 36 may slide inside said first slit 411 with respect to the base element 4.

The second case 42 comprises a second slit 421 with a rectangular section complementary to the scattered light filter plate 37 section, so that said scattered light filter plate 37 may slide inside the second slit 421. This configuration of the optical device 3 and the base element 4 allows aligning pairs of emitted and scattered light apertures with the optical path P1 of emitted and scattered light. It should be understood that these apertures are filter slots configured to receive paired filters 36*a*-37*a*, 36*b*-37*b*, 36*c*-37*c*, 36*d*-37*d*, 36*e*-37*e*, 36*f*-37*f*. In a preferred embodiment, the configuration of the optical device 3 and the base element 4 allows aligning pairs of emitted and scattered light filters 36 *a-f*, 37 *a-f* to the optical path of emitted and scattered light P1, P2.

The camera 43 is configured to capture the light scattered by the sample 13. The second slit 421 is therefore located between the sample holder 11 and the camera 43. Such camera 43 is therefore located after the second slit 421 in the scattered light path P2. This allows the image analysis to be performed thanks to this optical assembly.

Light emitted by the light source 30 follows first an emitted light path P1 through the first case 41, then crosses the emitted light filter plate 36 and then reaches the sample 13, which scatters the light. The scattered light then follows a scattered light path P2 that goes first through the second case 42, then crosses the scattered light filter plate 37 and then reaches the camera 43.

Figure 3A:
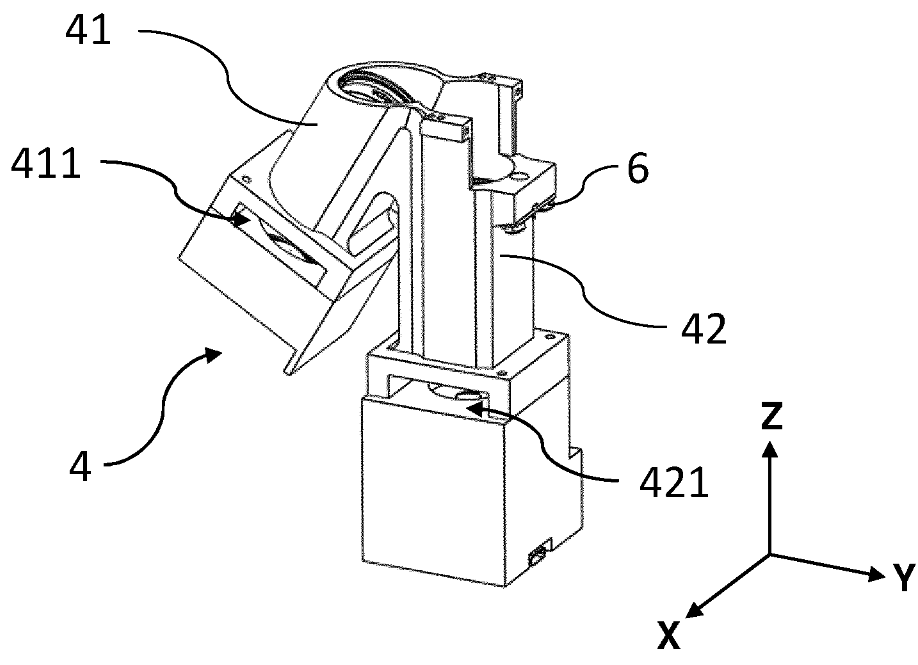
FIGS. 3A and 3B are respectively perspective and front views of a base element according to an embodiment of the invention comprising the first and second cases for housing the emitted and scattered lights.
Figure 3B:
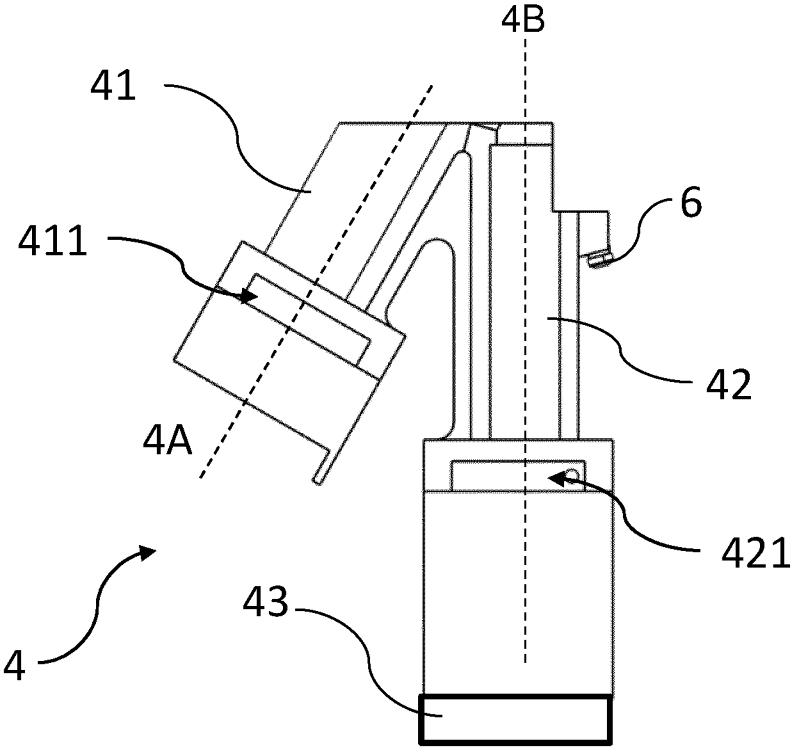

In an embodiment, which is illustrated in FIG. 3B, the system further comprises a bright field light source 6 positioned to illuminate the sample 13. In an embodiment, the bright field light source 6 may be fixed at the end portion of the second case 42 which is opposite to the camera 43 and positioned to illuminate the sample 13. This bright field light source 6 is configured to emit light towards the sample 13 held by the sample holder 11 and may for example be used to photoprocess the surface of the sample 13. More particularly, by using photobleaching-resistant fluorophores and photobleaching-sensitive fluorophores, two targets can be discriminated in a given single-color channel after exposition to the light emitted by the bright field light source 6. The bright field light source 6 may therefore create virtual color channels by selectively changing the fluorescing properties of the chemicals contained in sample 13.

Figure 4:
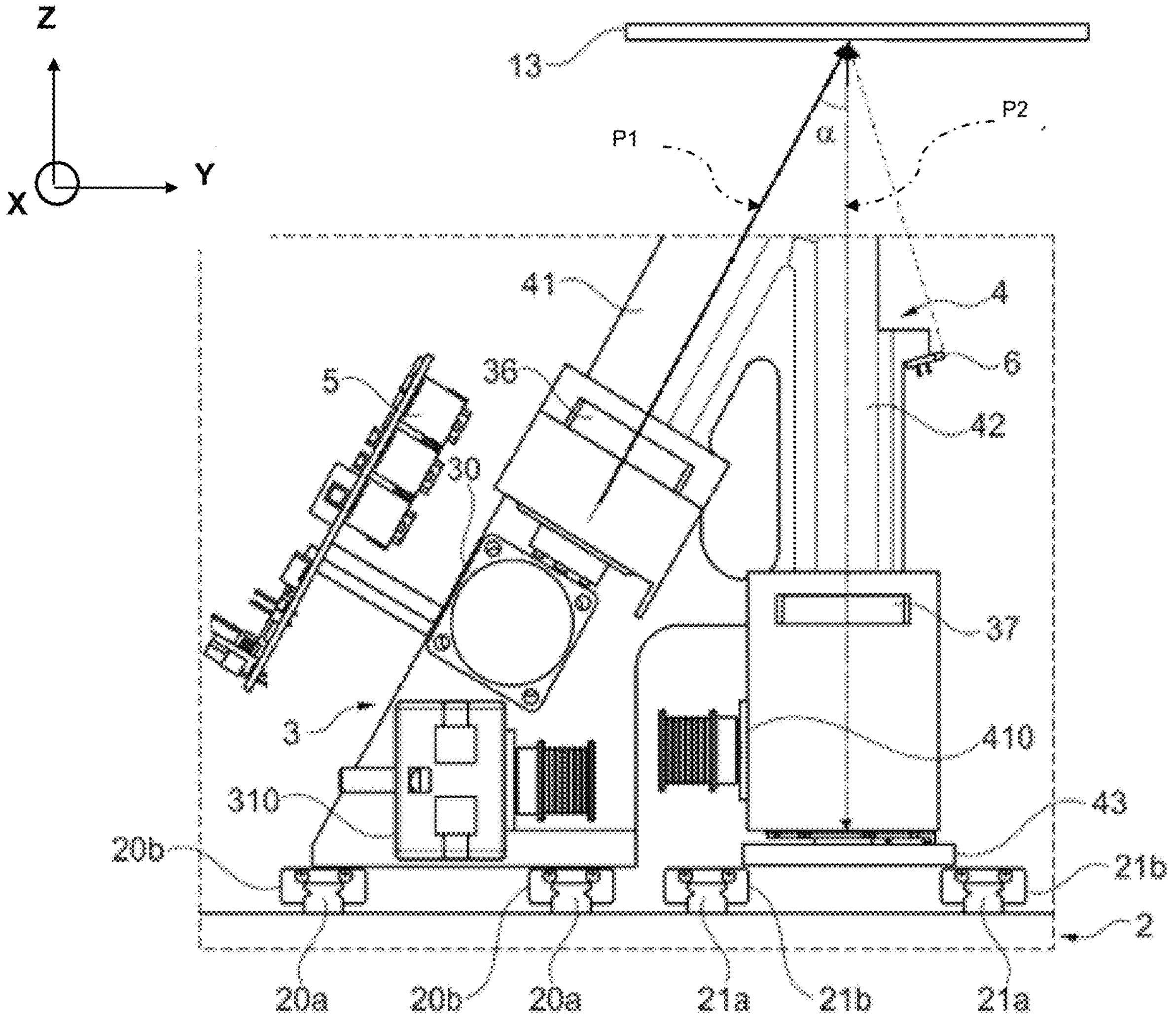
FIG. 4 is a frontal cross section view of an assembly of an optical device and support comprising the first and second cases according an embodiment of to the invention.

Advantageously, the same system may be used to scan the sample 13 and perform photobleaching. Indeed, the bright field light source 6 may be easily fixed to the system, typically to the second case 42 of the base element 4, such that the bright field light source 6 is illuminating the same region of the sample 13 as the light source 30. In that purpose, the bright field light source 6 and the light source 30 are symmetrical with respect to the longitudinal axis 4B, and therefore with respect to a plane that contains the region of the sample 13. For example, FIG. 4 illustrates that optical axis of the bright field light source 6 and of the light source 30 form one same angle with the plane that contains the sample 13 and the camera 43. The angle is substantially equal (+/−5°) to the angle α between the longitudinal axes 4A and 4B. This configuration drastically simplifies the system, since no motor nor any other additional device is necessary to perform photobleaching.

In a preferred embodiment, the light emitted by the bright field light source 6 is a low power bright field light, such as an LED. By low it should be understood that is does not substantially produce bleaching of the fluorophores contained in the sample during the time it is lit. The light emitted by the bright field light source 6 is detectable through one of the filters 37*a*, 37*b*, 37*c*, 37*d*, 37*e*, 37*f* located inside the scattered light apertures.

FIG. 4 shows the moveable assembly comprising the optical device 3 and the base element 4. This moveable assembly may be supported by a second stage 2.

In FIG. 4, the base element 4 is shown in front view with the first case 41. The longitudinal axis 4A of the first case 41 is aligned with the optical path P1 of the light emitted by the light source 30 towards the sample 13. The second case 42 of the base element 4 is also shown in front view. The longitudinal axis 4B of the second case 42 is aligned with the optical path P2 of the light scattered by the sample 13.

The second stage 2 forms a support for both the base element 4 and the optical device 3. The optical device 3 is movable with respect to the second stage 2 along a direction X. For example, the optical device 3 may be connected to the second stage 2 via displacement means 20 that include a first slide link 20 that extends along a X direction which is perpendicular to the Y and Z directions. The first slide link 20 may include a pair of U-shaped components 20*b* slidably associated to a pair of rails 20*a*. In the illustrated embodiment, the U-shaped components 20*b* are fixed to the optical device 3 and the rails are connected to the second stage 2. The U-shaped components 20*b* and the corresponding rails form a first rail system 20. Obviously, the equivalent opposite configuration, wherein the pair U-shaped components 20*b* are connected to the second stage 2 and the rails are fixed to the optical device 3 is also contemplated. In addition, the base element 4 may be connected to the second stage 2 via a displacement means 21 including second slide link 21 that extends along the X direction. The second slide link 21 may include a pair of U-shaped elements 21*b* slidably associated with a pair of rails 21*a*. The U-shaped components 21*b* and the corresponding rails form a second rail system 21. In the illustrated embodiment, the U-shaped components 21*b* are fixed to the base element 4 and the rails are connected to the second stage 2. Obviously, the equivalent opposite configuration, wherein the pair U-shaped components 21*b* are connected to the second stage 2 and the rails are fixed to the base element 4 is also contemplated. The two pairs of rails 20*a*,21*a* are parallel to the direction X.

The movement of the optical device 3 is driven by a corresponding motor 310 while the movement of the base element 4 is driven by a corresponding motor 410 distinct from motor 310, both movements being along direction X.

FIG. 4 shows an electronic control unit 5 for controlling alone or in combination the motors 110, 310 and 410. This electronic control unit 5 is also able to control the movement of the sample holder 11 in a direction Z perpendicular to the plane comprising the sample holder 11. The control is performed with the motor 17 along direction Z, see FIG. 1A.

The interaction between the optical device 3 and the base element 4 through the slits 411,421 is shown in FIG. 4 where the emitted light filter plate 36 appears inside the first slit 411 and the scattered light filter plate 37 appears inside the second slit 421. Thanks to this configuration, an independent control of the displacements of both the optical device 3 and the base element 4 can be performed allowing the light emitted by the light source and the light scattered by the sample 13 to go through different pairs of filters (illustrated here, but not limited to 36*a*-37*a*, 36*b*-37*b*, 36*c*-37*c*, 36*d*-37*d*, 36*e*-37*e*, 36*f*-37*f*) by displacing one of the optical device 3 and the base element 4 along the slide link 20 or 21, the other of the optical device 3 and the base element 4 remaining fixed. In the illustrated configuration, the optical device 3 is moved along the rails 20*a* with respect to the base element 4, which is fixed with respect to the second stage 2 and the sample 13. Consequently, only the filters (and optionally the light sources) placed on the emitted light path P1 and the scattered light path P2 are changed to switch the analysis channel. More particularly, the region of the sample 13 which is analyzed remains the same. This participates in improving accuracy of the measurements, since the size of the objects of the sample to be analyzed may be very small (droplets of the order of 100 μm), such that any movement of the sample while the filters are changed would be detrimental to the measurements. The measurement accuracy is even improved because the sample 13 is fixed when the filters are changed: indeed, any movement of the sample 13 necessary implies a small movement of the droplets contained therein. Therefore, by only moving the filters, one makes sure that the optical paths P1, P2 remain fixed with respect to the sample 13.

With the system of the invention, accuracy of the measurements can be better than 25 μm when two subsequent sample images are recorded in two different light channels. It becomes therefore possible to assign droplets from one channel to the other and for example allow multiplexing of several biological items in one same droplet.

Besides, the base element 4 may be moved along the second slide link 21 with respect to the first and second stages 1, 2. In the illustrated configuration, the base element 4 is moved along the rails 21*a* with respect to the second stage 2, which is fixed with respect to the sample 13. This movement allows scanning of another region of the sample 13 to be imaged by the camera 43.

The advantage brought by the system and the kinematic according to the invention will now be explained thanks to the FIGS. 5 and 6 which are perspective views of such system.

Figure 5:
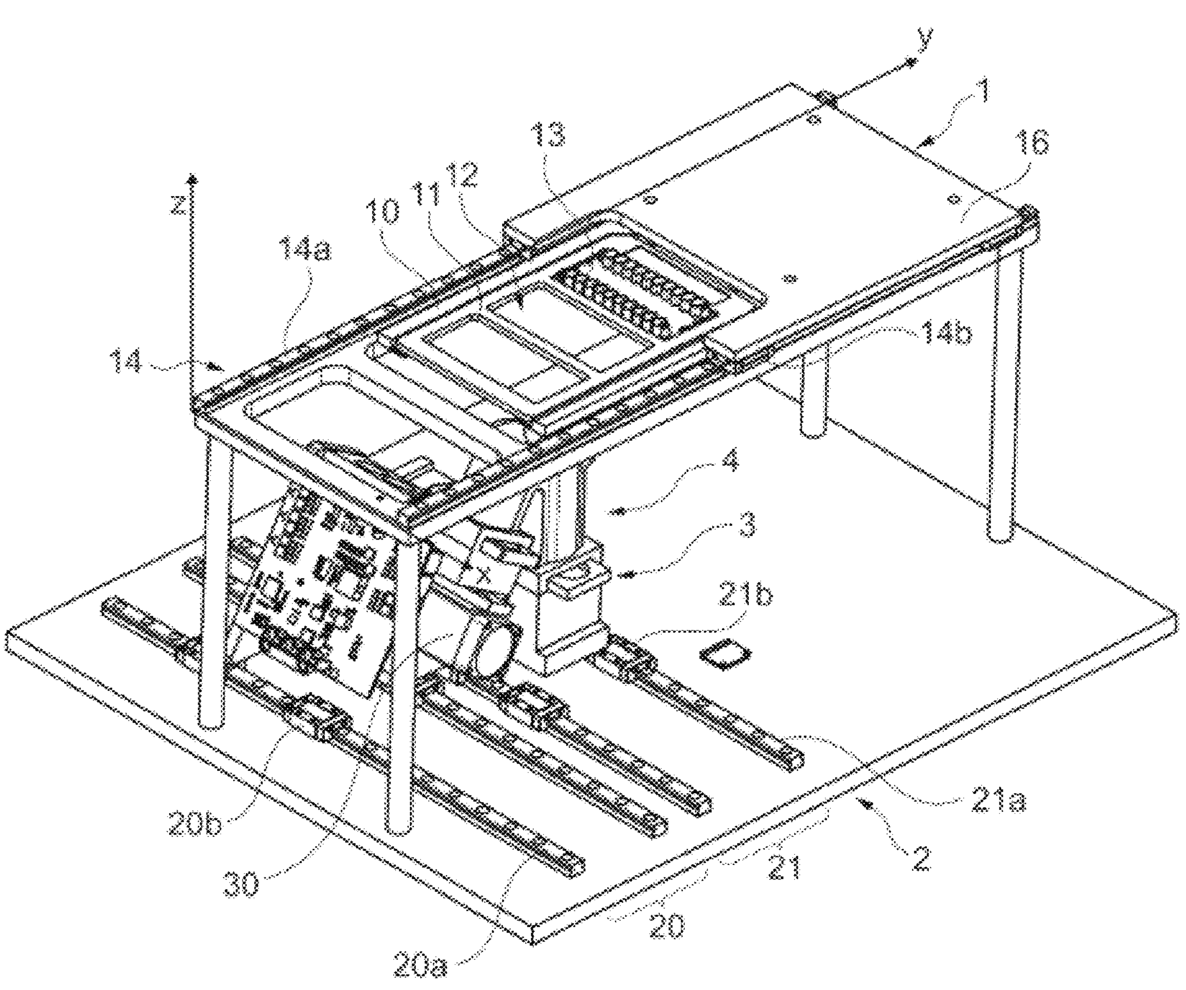
FIG. 5 is a global perspective view of a system according to an embodiment of the invention.
Figure 6:
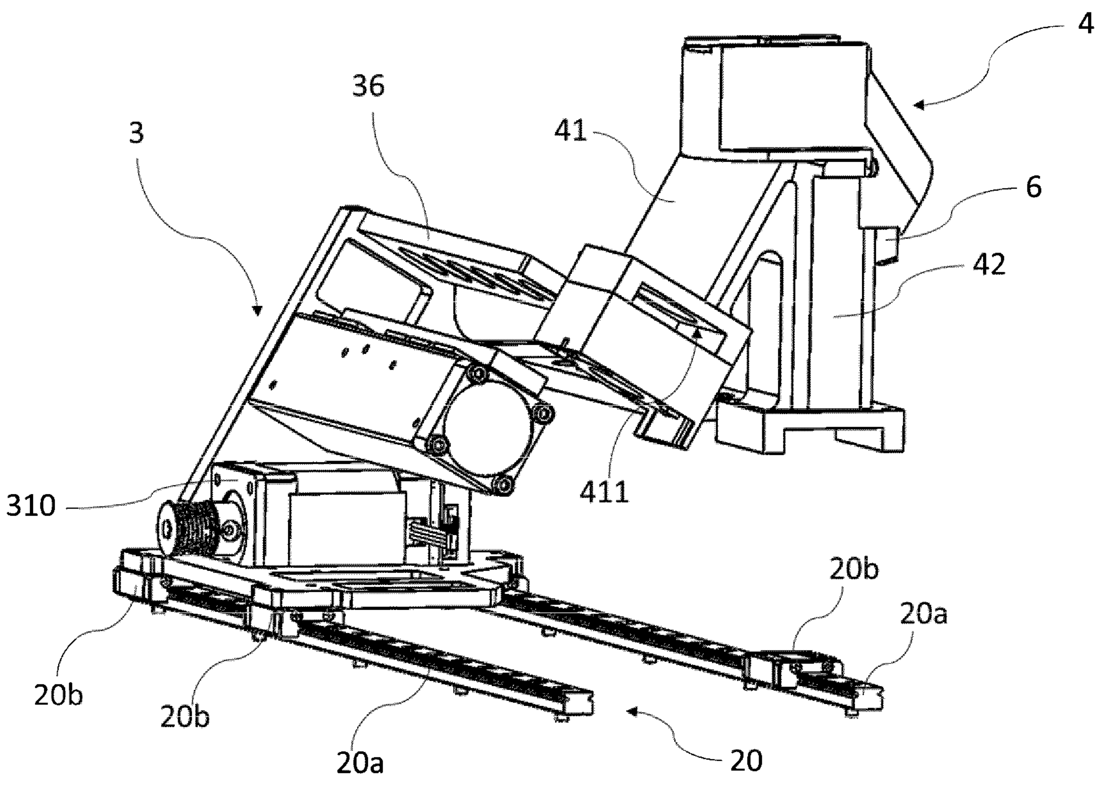
FIG. 6 is a perspective view of a system according to an embodiment of the invention showing an optical device, partial view of a base element and second displacement means according to an embodiment of the invention.

According to the invention and referring to FIG. 5, a sample 13 to be imaged is accommodated into the sample holder 11. In the illustrated embodiment, the sample 13 is set inside one of the three sample slots 12 of the sample holder 11. In the configuration of FIG. 5, three samples 13 can thus be analyzed. In other embodiments of the invention, a different number of samples 13 could be analyzed and different types of sample holders 11 could be used.

When light is emitted by the light source 30, it goes through a filter 36*a*, 36*b*, 36*c*, 36*d*, 36*e* or 36*f* of emitted light filter plate 36 to excite the sample 13 at a given wavelength before being scattered by said sample 13 and passing through the corresponding scattered light filter 37*a*, 37*b*, 37*c*, 37*d*, 37*e*, 37*f*. Eventually, the scattered light is captured by the camera 43.

Thanks to the second slide link 20, the filters through which the emitted and scattered lights pass and the well can be changed. In an embodiment, the light sources 30 are changed simultaneously. For instance, in FIG. 6, the filter plates 36, 37 have been moved out of the paths P1, P2 of the light. The movement is motorized (cf. motor 310 in FIG. 6) along the slide link 20 in the X direction. During such movement the emitted light filter plate 36 slides within the first slit 411 of the base element 4 while, at the same time, the scattered light filter plate 37 slides within the second slit 421 of the base element 4. In an embodiment, the array of Light Emitting Diodes (LED) 35 slides simultaneously. Different pairs of filters can therefore be used for the same sample region to be scanned. Their longitudinal arrangement reduces congestion inside the system and makes the assembly between the optical device 3 and the base element 4 less cumbersome than another arrangement.

Additionally, in order to change the region of the sample 13 to be scanned, the motor 110 (cf. FIG. 1A) can drive the sample holder 11 along the Y direction though the first rail system 14. In this case, the sample 13 moves along the said first Y direction and a different region can be imaged. For this new area to be imaged, different filters can also be used by displacing the optical device 3 as explained previously along the slide link 20.

Alternatively or additionally, in order to change the region of the sample 13 to be scanned in the X direction, the motor 410 may move the base element 4 along the second slide link 21. In this case, the second stage 2 and the first stage 1 (including the sample 13) remain fixed. However, due to the translation of the optical element 4, the light source 30 emits light towards a different area to be imaged. The optical device 3 may be moved simultaneously by the motor 310 with the base element 4 along direction X. Then, different filters and LEDs can also be used by displacing the optical device 3 with respect to the base element 4, as explained previously.

At this stage, a two-dimensional zone is imaged with the possibility for each region of the sample 13 to be scanned and to change the filters used. All these possibilities being motorized as previously explained.

Finally, the sample holder 11 may be moved by motor 17 along the Z direction, which is perpendicular to the Y and X direction, for a focus adjustment.

In view of the above, three movements are possible:

A first movement in the X direction and a second movement in the second Y direction for a two-dimensional zone image scanning.

A third movement in the Z direction for each of these positions for measurements in a three-dimensional reference space.

Besides, the emitted and scattered light filters can be changed by associated pairs.

One of skill in the art will appreciate that the arrangement according to the invention brings flexibility for image scanning, sample positioning and filter selection. The invention is particularly suitable for digital PCR.

REFERENCES

1—first stage
10—holder support
11—sample holder
12—sample slot
13—sample
14—slide link
14*a*—rail system,
14*b*—U-shaped components
16—lid
17—motor
110—motor
Y—first direction
X—second direction
Z—third direction
2—second stage
20—first slide link
21—second slide link
20*a*, 21*a*—second and third rails
20*b*, 21*b*—U-shaped components
3—optical device
30—light source
310—motor
32—main plate
33—main plate edge
34—main plate extending arm
35—LED
36—emitted light filter plate
36*a*, 36*b*,36*c*,36*d*,36*e*, 36*f*—emitted light filters
37—scattered light filter plate
37*a*, 37*b*, 37*c*, 37*d*, 37*e*, 37*f*—scattered light filters
4—base element
41—first case
410—motor
411—first slit
42—second case
421—second slit
4A—first case longitudinal axis
4B—second case longitudinal axis
43—camera
5—electronic control unit
6—bright field light source
α—angle between the longitudinal axis 4A of the first case and the longitudinal axis 4B of the second case.

The invention claimed is:

1. A system for scanning a sample comprising:
a sample holder configured to hold a sample;
an optical device comprising a light source for emitting light towards the sample holder, an emitted light filter plate comprising a first array of filters, and a scattered light filter plate comprising a second array of filters;
a base element comprising a first case extending along an optical path of the light emitted by the light source towards the sample holder and a second case extending along an optical path of light scattered by a sample held in the sample holder;
wherein the emitted light filter plate is positioned along the optical path of the emitted light and the scattered light filter plate is positioned along the optical path of the scattered light; and
wherein the first case is fixed with respect to the second case;
first displacement means coupled to at least one of the optical device and the base element for relatively moving the emitted light filter plate and the scattered light filter plate of the optical device with respect to the base element along a first direction; and
second displacement means, which is distinct from the first displacement means and is coupled to at least one of the base element and the sample holder for relatively moving the base element and the sample holder with respect to each other along the first direction, such that the optical path of the emitted light moves with respect to a sample held in the sample holder.

2. The system of claim 1, wherein the first case extends along a first longitudinal axis and the second case extends along a second longitudinal axis, the first longitudinal axis and the second longitudinal axis forming an angle lower than 90°.

3. The system of claim 2, wherein said angle is between 30° and 45°.

4. The system of claim 1, wherein the first and second displacement means comprise slide links, which are parallel to each other and extend along the first direction (X).

5. The system of claim 1, further comprising an additional displacement means coupled to the sample holder for moving the sample holder with respect to the base element in a second direction.

6. The system of claim 5, wherein the second direction is perpendicular to the first direction.

7. The system of claim 1, wherein the first displacement means is configured to move the optical device with respect to the base element and the second displacement means is configured to move the base element with respect to the sample holder.

8. The system of claim 1, wherein the sample holder comprises at least one sample slot.

9. The system of claim 1, wherein the optical device further comprises a main plate that extends in a plane perpendicular to the sample holder and from which extends, along the first direction, the light source, the emitted light filter plate, and the scattered light filter plate.

10. The system of claim 1, wherein the first case comprises a first slit that extends along the first direction and is configured to receive the emitted light filter plate, and the second case comprises a second slit that extends along the first direction and is configured to receive the scattered light filter plate, such that the emitted light filter plate and the scattered light filter plate slide inside the first and second slits to align a pair of emitted and scattered light filters with the optical path of the emitted light and the optical path of the scattered light.

11. The system of claim 1, wherein the emitted light filter plate comprises a number of emitted light filters and the scattered light filter plate comprises the same number of scattered light filters.

12. The system of claim 1, further comprising a bright field light source coupled to the second case and configured to emit a bright light towards a sample held in the sample holder.

13. The system of claim 12, wherein the optical axis of the bright field light source and the optical axis of the light source are symmetrical with respect to the optical path of the scattered light.

14. The system of claim 1, wherein the optical device and the base element are connected to a second stage via the first and second displacement means.

15. The system of claim 14, wherein the optical device and the base element are located between the sample holder and the second stage.

16. The system of claim 1, further comprising an electronic control unit for controlling movement of at least one of the optical device, the base element, and the sample holder.

17. The system of claim 1, further comprising a camera for receiving light scattered by a sample held in the sample holder.

18. The system of claim 1, wherein the emitted light filter plate is fixed with respect to the scattered light filter plate and the light source.

* * * * *